July 27, 1965  J. F. DREYER  3,196,743
LIGHT MODULATION DEVICE EMPLOYING A SCOTOPHORIC LIGHT VALVE
Filed Sept. 29, 1961
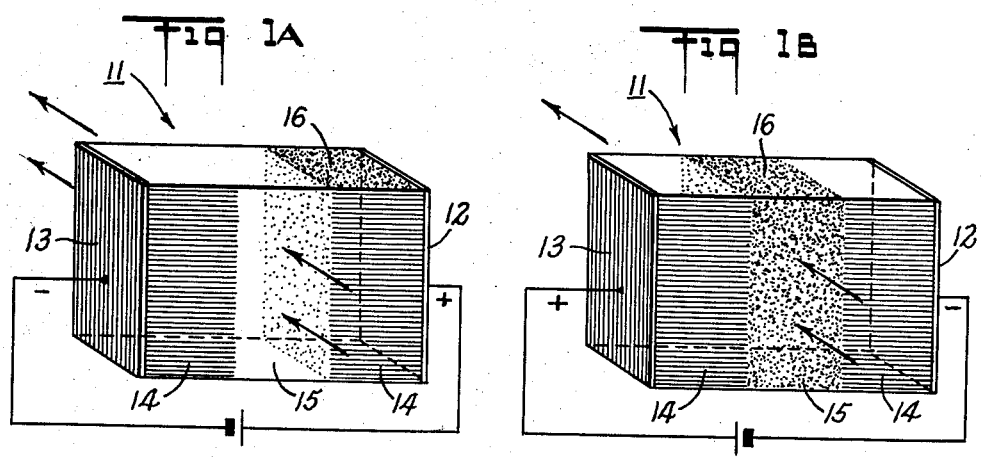
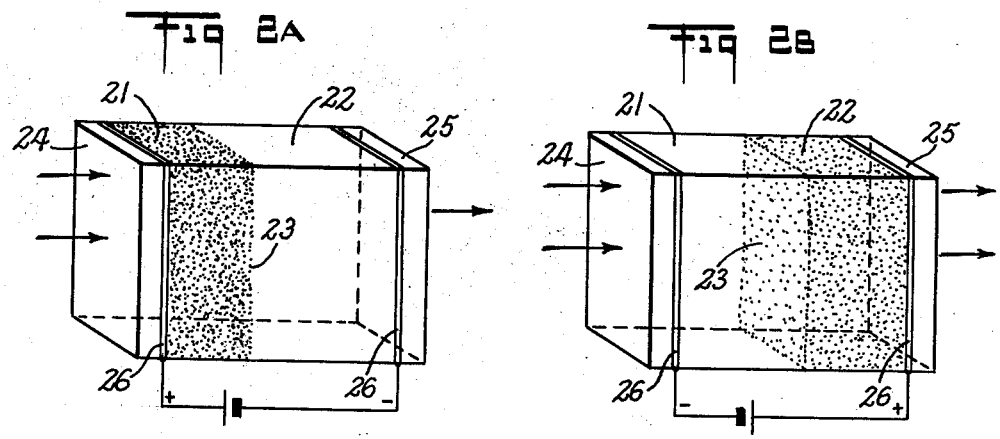
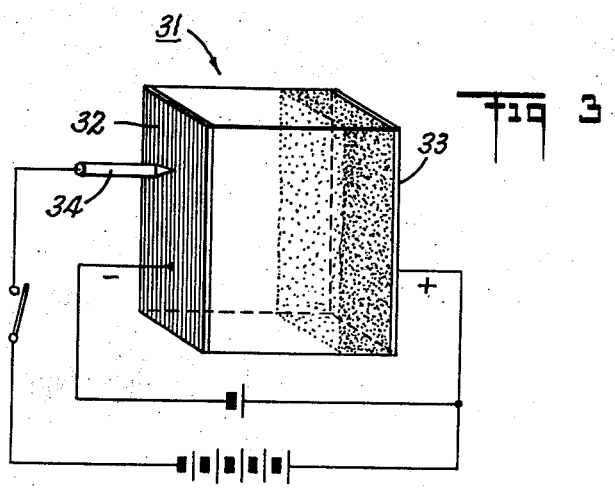
INVENTOR
John F. Dreyer
BY
Curtis Morris + Safford
ATTORNEYS

United States Patent Office 3,196,743
Patented July 27, 1965

3,196,743
LIGHT MODULATION DEVICE EMPLOYING A SCOTOPHORIC LIGHT VALVE
John F. Dreyer, Cincinnati, Ohio, assignor to Polacoat Incorporated, Blue Ash, Ohio
Filed Sept. 29, 1961, Ser. No. 141,900
5 Claims. (Cl. 88—61)

This invention relates to devices and methods for modulating light. In particular, this invention relates to light modulation devices and methods employing a scotophor as a light valve, and to such light valves.

A scotophor, as the term is used herein, is a material which is tenebrescent. Tenebrescence is the property possessed by certain natural and synthetic materials of reversibly darkening and bleaching under suitable irradiation (cf. H. Leverenz, "Luminescence of Solids," John Wiley & Sons, New York, 1950).

As discussed in "Irradiation Colours and Luminescence" by K. Przibram, Pergamon Press Limited, London, 1956, and "Introduction to Solid States Physics" by C. Kittel, John Wiley & Sons, Inc., New York, 1953, crystalline materials in which imperfections in the crystal lattice produce defect energy levels lying in energy zones which would be forbidden in perfect crystals can show reversible color reactions under the influence of radiation. Electrons raised from a filled band to the conduction band of such a crystal under suitable excitation (e.g. irradiation with ultra-violet light) may fall back into these defect energy levels. Because of the new possibility for electron transitions between the defect levels and the conduction band, the absorption spectrum of the crystal is changed, i.e. it becomes colored. By thermal or optical excitation of the electrons trapped in the defect energy levels, transitions returning the electrons from the defect levels to the filled band can be stimulated, which explains the loss of color or "bleaching" observed in scotophors.

Although the phenomenon of tenebrescence is not completely understood, it can be likened to the property of luminescence exhibited by phosphors. Both scotophors and phosphors are alike in that radiation induces an absorption band associated with trapped excited electrons. However, phosphors make radiative transitions to the ground state, whereas scotophors make non-radiative transitions.

It has been hypothesized that the tenebrescent activity of scotophors is associated with electrons trapped in anion defects within a crystal, whereas phosphors exhibit luminescence because of electrons trapped in the electric field of multivalent cation impurities within crystals. The scotophor electron bound to an anion vacancy within the crystal has been termed an "F–center." Although F–center activity has generally been explained as due to mobile electrons in a scotophoric crystal, it is not entirely clear that only electron mobility is involved. It is possible that ionic mobility is also a mechanism in F–center migration, particularly in complex minerals. The mobile F–centers and/or ions are herein referred to as "color centers."

The migration of color centers in an electric field is reported on pages 58–59 of the volume by Przibram mentioned above. For example, a colored potassium bromide crystal having color centers exhibits migration of the color centers—and the color—when the crystal is placed within an electric field. The color centers migrate toward the point of lowest potential in the field, and the color of the crystal visibly moves through the crystal, with a rather well-defined edge, toward the point of lowest potential. In the present invention, this phenomenon of migration of color centers, or of color, in a scotophor under the influence of an electric field has been employed in the construction of electric light valves.

A better understanding of the invention and its many advantages will be had by referring to the figures in the accompanying drawings, which figures illustrate certain preferred embodiments of the invention.

FIGURES 1A and 1B show a pellucid scotophor having opposite electric fields;

FIGURES 2A and 2B show another embodiment of a pellucid scotophor having different discrete crystal portions; and FIGURE 3 shows a pellucid scotophor in which color centers may be injected into the crystal.

FIGURE 1A shows pellucid (i.e. transparent or translucent) scotophor crystal 11, such as of potassium bromide, having opposing anode 12 and cathode 13 on two faces thereof. Suitable electrodes are, for example, metal films, as of gold, silver, chromium, aluminum, or the like, deposited on the crystal by electrodeposition, evaporation, sputtering, or related techniques. A third face of crystal 11 may be suitably masked in the area of electrodes 12 and 13 to make the crystal opaque to incident light in regions 14. The masking may be accomplished, for example, by covering the face of the crystal with a suitable opaque substance such as paint, paper, wood, etc. Between opaque overlays 14, remains region 15 in which a light-transmitting portion of crystal 11 is exposed. Incident light passed through crystal 11 in region 15 can be detected on the other side of the crystal by the eye or other appropriate light-detecting means such as a photoelectric cell. As shown in FIGURE 1A, crystal 11 contains numerous mobile color centers in portion 16 behind masked area 14 in the region of the anode. In a potassium bromide crystal, for example, these color centers impart a deep blue color to the crystal due to an absorption band having a maximum at about 630 millimicrons. In this and succeeding figures, a relatively unimpeded transmission of visible light through the crystal specifically portion 15 of FIGURE 1A) is indicated by the entry and emergence of an equal number of arrows. Absorption or partial absorption of incident light is indicated by fewer emergent than incident arrows.

FIGURE 1B shows the same crystal as in FIGURE 1A after the polarity of the electrodes 12 and 13 has been reversed. By reversing the field within the crystal, the color centers in the crystal have been caused to migrate toward new anode 13. In migrating, the color centers pass through region 15 of the crystal, intercepting light incident on the crystal in this region. The absorption of a portion of the incident light caused by the color centers in the path of the light beam passing through the crystal can be detected on the far side of crystal 11 either visually or by light-sensitive means. A change in the direction of the field applied to crystal 11, thus, can be used to modulate the intensity of a light beam passing through the crystal.

To increase the transmission of incident light by crystal 11, the field applied to crystal 11 may again be reversed from that shown in FIGURE 1B to that shown in FIGURE 1A, whereupon the color centers again migrate behind a masked portion of the crystal. Alternatively, the field applied in FIGURE 1B may simply be applied for a sufficiently long period that the color centers migrate behind masked portion 14 of crystal 11 surrounding anode 13 of FIGURE 1B.

The speed of migration of the color centers within the crystal may be increased by heating the crystal to temperatures above room temperature, for example to temperatures up to 400° C., but below the melting point of the crystal. At elevated temperatures, the speed of color center movement can be high enough to effect changes in light transmission in a fraction of a second. Similarly, as the magnitude of the potential field applied across the crystal increases, the speed of migration of the color centers increases, providing the voltage is kept below a value causing dielectric breakdown of the crystal. The speed of color center migration is often affected by the presence of impurities in the crystal. For example, the presence of cadmium chloride in potassium chloride markedly increases the velocity of color center migration in potassium chloride crystals.

FIGURE 2A shows another embodiment of the invention in which first pellucid scotophor crystal portion 21 is in contiguous relationship with second pellucid crystal portion 22 through an electrically continuous boundary 23. Pellucid electrodes 24 and 25 are in electrical contact with crystal portions 21 and 22, respectively. In FIGURE 2A these electrodes are shown as of transparent glass coated with thin transparent or translucent conducting coating 26 such as a thin film of metal or of some other conducting substance, although pellucid thin metal films applied directly to crystal portions 21 and 22 could also be employed. Conducting glasses having thin transparent films of tin oxide are commercially available, for example. FIGURE 2A shows electrode 24 to be anodically biased and the presence of color centers, that is of color, in first crystal portion 21. Incident light passed through the electrode-crystal complex (shown in FIGURE 2A as passing from left to right) will be absorbed by the color centers in portion 21 of the crystal.

FIGURE 2B of the drawing shows the same device after reversal of polarity of the electrodes. The color centers present in crystal portion 21 of FIGURE 2A have now migrated to crystal portion 22 in FIGURE 2B. Suitably, the material of crystal portion 22 is one in which the absorption maximum associated with the color centers present therein differs from the absorption maximum evidenced by color centers in crystal portion 21. For example, portion 22 may comprise a scotophor for which the absorption maximum associated with color centers is in a different portion of the visible spectrum, or may be a material in which the absorption maximum is in the non-visible spectrum, for example in the infra-red, so that crystal portion 22 remains colorless even when permeated with the color centers.

Thus, for example, portion 21 of FIGURES 2A and 2B may be of sodium chloride, in which color centers have an absorption maximum of about 465 millimicrons and impart an amber yellow color to the activated crystal. Portion 22 may suitably be of calcium chloride, deposited from a melt on the more refractory sodium chloride. $CaCl_2$ has an absorption maximum, associated with color centers, at about 775 millimicrons in the near infra-red and, thus, exhibits little visible color when such centers are present. This epitaxial crystal combination is particularly suitable since the radii of the anions in the two crystals are approximately equal, the radius of sodium ion being about 0.98 A., and that of calcium ion being about 0.99 A.

However, a material absorbing visible light could be used as crystal portion 22, providing only that it shows an absorption maximum different from the absorption maximum of portion 21. Thus, migration of the color centers out of portion 21, where they may, for example, show a yellow color, into portion 22, where they may show a blue color, for example, will cause an appreciable change in the quality of visible radiation transmitted by the crystal. KCl and RbCl can be crystallized together in all proportions, for example, both showing color center absorption in the visible. The color shift for this crystal pair is about 50 millimicrons.

Crystal portions 21 and 22 need not be of different materials. As hereinafter discussed, color center activity can be associated with ion impurities in a crystal. By doping different regions of a single crystalline substance, different color centers can be produced in the different regions to give crystal portions like those shown as 21 and 22.

FIGURE 3 shows a still further embodiment of the invention in which scotophor crystal 31 containing color centers in a portion thereof has applied thereto pellucid electrodes 32 and 33. By application of an electric field across the electrodes as shown, the color centers in the crystal can be made to migrate toward anode 33 and to disappear in part or entirely from the crystal. Incident light travelling through the crystal (from left to right as shown in the drawing) will, thus, encounter, and be partially absorbed by, color centers whose number is variable depending on the extent to which mobile electrons and/or ions producing coloration have been "bled" from the crystal to anode 33. The amount of light adsorbed will be dependent on the length of the light path, through the crystal, in which color centers are present, i.e. on the number of color centers in the light path. This number is decreasable by draining the color centers to anode 33.

As hereinafter described, color centers may be regenerated in crystal 31 by irradiation of the crystal with ultraviolet light or other excitating radiation, or by application of high-non-sparking voltages across the crystal. Injection of electron color centers into a crystal by high voltages using a pointed cathode, shown as 34 in FIGURE 3, is reported by A. Von Hippel, "Electrolysis, Dendritic Growth and Breakdown of Alkali Halide Crystals" (Ger.) Z. Phys. 98, 580 (1936).

Scotophors showing color center activity are numerous, and may be either naturally-occurring or synthetic. Thus, the alkali halides are scotophors. The absorption maxima (in millimicrons) and colors of some of the alkali halides are reported below in Table 1.

TABLE 1

| | F | Cl | Br | I |
|---|---|---|---|---|
| Li | 250 (U.V.) / Colorless | 385 / Lt. yellow | | |
| Na | 340 / Lt. yellow | 465 / Amber | 540 / Violet | 588. Blue. |
| K | 455 / Yellow | 563 / Blue violet | 630 / Deep blue | 685. Green. |
| Rb | — / Violet | 610 / Blue | 720 / Green-blue | 775 (I.R.). Colorless. |
| Cs | — / Green-blue | 600 / Blue | | |

The halides may be either synthetic or naturally occurring. For example, rocksalt, sylvine (KCl), and villiaumite (NaF) are found in colored forms in which the color is due to color center activity. Other chlorides such as lanthanum chloride and silver chloride, including the mineral hornsilver, and fluorides such as fluorite ($CaF_2$) show color center coloration.

Numerous oxides including $SiO_2$, $Al_2O_3$, $TiO$, $ThO_2$, $SnO_2$, $Ta_2O_5$, $ZrO_2$, $MoO_3$, $Sb_2O_5$, $ZnO$, $CeO$, and $MgO$, show color center activity, both as synthetics and as naturally occurring minerals such as quartz, zircon $$(SiO_2 \cdot ZrO_2)$$

and corundum. Synthetic and mineral sulfides such as zinc blend (ZnS), carbonate minerals such as calcite ($CaCO_3$), phosphates such as apatite [$FCa_5(PO_4)_3$], sulfates such as langbeinite ($K_2SO_4 \cdot 2MgSO_4$), nitrates such as saltpeter ($NaNO_3$), cyanides such as NaCN, thiocyanates such as $NH_4SCN$, borates, tungstates, and silicates such as spodume ($LiAlSi_2O_6$), sodalite $$(3NaAlSiO_4 \cdot NaCl)$$

topaz [$(FeOH)_2Al_2SiO_4$] and other minerals such as feldspar, mica, beryl, tourmaline, pyromorphite, cancrinite, calcocroite, brazilianite, phenakite, kunzite, scapolite, sapphire, oligoclase, lapis lazuli, and barytes show color center colors. A silicate mineral of particular interest as a scotophor is Hackmanite [$Na_4(AlCl)Al_2(SiO_4)_3$].

This mineral is naturally occurring or can be synthetically prepared as disclosed in U.S. 2,761,846 to Medved, granted May 28, 1952. The material may show a variety of colors in the presence of impurities. Sulfur impurities, for example, result in a purple color. Selenium impurities impart a red tinge, whereas tellurium causes the mineral to show a yellow color. Similarly, a blue coloration in Hackmanite appears to be due to the presence of defects associated with excess sodium ions, a yellow color with silver ions, a dark violet with lithium ions. It has now also been found that a blue tenebrescence occurs if chloride ions in Hackmanite are replaced by iodide ions. Colorless forms contain calcium or zinc impurities. The same mineral, thus, can be made to absorb light of different wavelengths.

In the many materials supporting color center activity, including those specifically mentioned above, color centers can be generated by radiation of appropriately high energy. As reported in the earlier mentioned volume of Przibram, color centers can be generated in crystals by irradiation with ultra-violet light (wavelengths less than about 400 millimicrons such as those generated in a mercury arc lamp), X-rays, gamma rays from natural or synthetic radioactive sources, and cathode or beta rays.

Certain crystals, including the alkali halides, can be made color center active by exposure to metallic vapors. Thus, sodium or potassium can be diffused into the alkali halides at elevated temperatures of about 600°–700° C. to produce characteristic color center colors. Evidently, such halides containing diffused sodium and potassium atoms will contain anion defects in the lattice as well as mobile electrons derived from the diffused atoms.

Color centers may also be created in synthetic crystals by electrolysis of melts from which a crystal is being drawn by known crystal pulling techniques.

As mentioned earlier, color center activity can also be generated by the passage of high voltage current through crystals, or can be associated with the presence of ionic impurities within the crystal lattice. The creation of color centers by synthesis of crystals in which the components are present in non-stoichiometric proportions is preferred to radiation techniques, since the latter usually produce both positively and negatively charged ions or particles which tend to recombine to reduce the total number of color centers produced.

Scotophoric sodium bromide having a characteristic blue color has been produced in the Wirtz-Fittig synthesis of ethyl benzene:

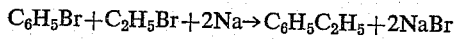
$$C_6H_5Br + C_2H_5Br + 2Na \rightarrow C_6H_5C_2H_5 + 2NaBr$$

It has now also been found that the presence of slight amounts of impurities in a scotophor may have a significant effect on the bleaching reaction or disappearance of color in the scotophor under irradiation with light of relatively long wavelengths, such as visible light. Thus, it is possible to synthesize Hackmanite having a characteristic raspberry red color center color when irradiated with ultraviolet light, but which is extremely resistant to color fading in visible light.

In any event, if bleaching occurs in the scotophors employed in the electrical light valves of the present invention, the color centers can readily be generated within the crystals by re-irradiation of the crystal with appropriate high energy radiation such as ultraviolet light.

The devices of the invention are useful for modulating light in such practical applications as fenestration. For example, transparent electrodes 24 and 25 of FIGURES 2A and 2B may be considered the panes of a double walled window containing a sandwiched scotophor. By variation of the potential field across the panes, the amount of incident light passed through the window may be controlled. The embodiments shown in FIGURES 1A and 1B and 3 can also be modified for use in fenestration or other applications in which electrical modulation of light intensity is desired.

Although specific embodiments have been shown and described, it is to be understood that they are illustrative and are not to be construed as limiting the scope and spirit of the invention.

I claim:
1. A device for light modulation comprising a light beam and a light valve therein, said light valve comprising a pellucid scotophor having mobile color centers therein and having a plurality of different discrete crystal portions in which the presence of said mobile color centers imparts characteristic peak light absorption at different wavelengths, said crystal portions being contiguous and electrically continuous, and means for establishing a variable potential gradient in said scotophor, whereby the relative number and position of color centers in each of said plurality of crystal portions can be varied.

2. A device as in claim 1 wherein said means for establishing a variable potential gradient in said scotophor comprises an electrode on each of a plurality of opposing crystal faces of said scotophor with said plurality of crystal portions therebetween.

3. A device as in claim 2 wherein said electrodes are pellucid and said light beam is passed through them and said plurality of crystal portions therebetween.

4. A device as in claim 1 wherein said scotophor is a single crystal and each of said plurality of crystal portions contains a different doping impurity altering the peak absorption of color centers therein.

5. A device as in claim 1 wherein said scotophor comprises a plurality of epitaxial crystal portions.

References Cited by the Examiner
UNITED STATES PATENTS

| | | | |
|---|---|---|---|
| 2,776,367 | 1/57 | Lehovec | 88—61 |
| 2,811,898 | 11/57 | West | 88—61 |

OTHER REFERENCES

Gnaedinger: Journal of Chemical Physics, vol. 21, No. 2, February 1953, pages 323 to 330.

Hilsch et al.: Zeit. fur Physik, vol. 111, pages 399 to 408, (1938–1939).

Irradiation Colours and Luminescence (Przibram), published by Pergamon Press Ltd., London, 1956, pages 11, 15, 35, to 39, 53 to 55, 58 and 59 relied on.

Luminescence of Solids (Leverenz), published by John Wiley & Sons, Inc., New York, 1950, pages 310 to 312 relied on.

Staisw: Nachr. Ges. Wiss. Gottingen, M.P.K., pages 261 to 267 (1932); pages 387 to 393 (1933); pages 1 to 7 and 131 to 137 (1936).

JEWELL H. PEDERSEN, *Primary Examiner.*